United States Patent [19]

Henry

[11] Patent Number: 4,597,147

[45] Date of Patent: Jul. 1, 1986

[54] STOP CHANGER TOOL FOR IN-SERVICE VALVE

[75] Inventor: Ralph E. Henry, Rixford, Pa.

[73] Assignee: Dresser Industries, Inc., Dallas, Tex.

[21] Appl. No.: 654,280

[22] Filed: Sep. 24, 1984

[51] Int. Cl.[4] ............................................. B23P 19/04
[52] U.S. Cl. .................................... 29/213 R; 138/89; 138/97
[58] Field of Search ...................... 29/213; 138/89, 97; 220/234, 235, 236, 237, 238

[56]  References Cited

U.S. PATENT DOCUMENTS

| | | | |
|---|---|---|---|
| 2,299,365 | 10/1942 | Valuch | 29/213 R |
| 2,462,748 | 2/1949 | Johnson | 138/89 |
| 2,867,243 | 1/1959 | Bowan | 138/89 |
| 3,044,496 | 7/1962 | Maisch | 220/235 |
| 4,418,592 | 12/1983 | Altman | 82/34 |

OTHER PUBLICATIONS

Muller Company brochure: "Plugging Unit Parts and Dimensions", regarding stop changer plugging units H-17010 to 17014.

Primary Examiner—James L. Jones, Jr.

[57] ABSTRACT

A stop changer tool for removal of an in-service valve under pressure and comprised of a displaceable shaft assembly supporting at one end an axially compressible elastomeric plug adapted to be inserted through the valve into the upstream pipe. The plug is mounted between a pair of restraining ends such that displacing the shaft assembly in a withdrawal direction draws the restraining ends toward each other to compress and diametrically enlarge the plug until a pressure sealing engagement is achieved with the pipe surface thereat. The restraining ends are formed of laterally displaceable contiguous elements having predetermined face angles on opposing surfaces whereby they are relatively displaced laterally outward concomitantly with compression of the plug so as to substantially restrain the plug against axial extrusion.

7 Claims, 9 Drawing Figures

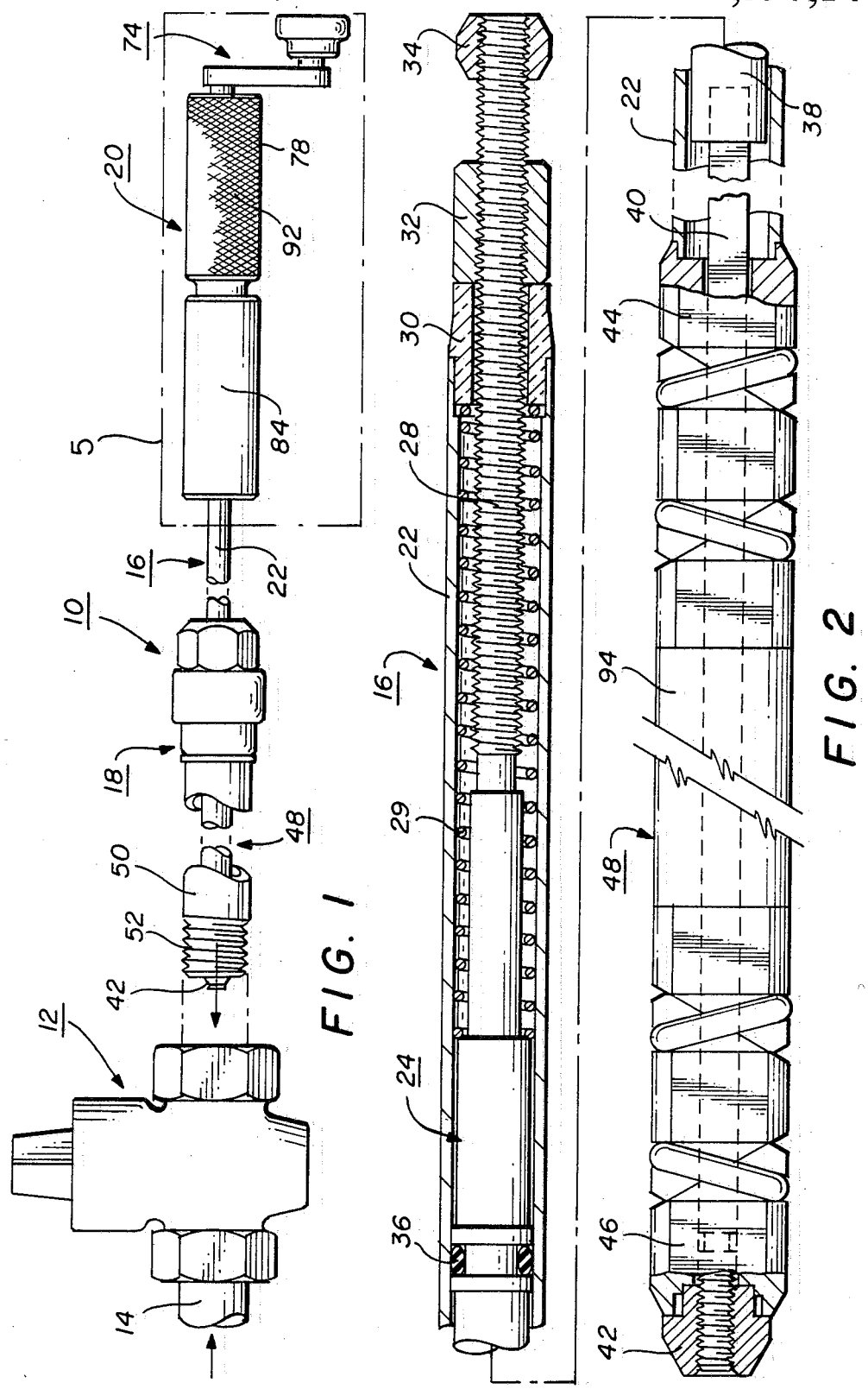

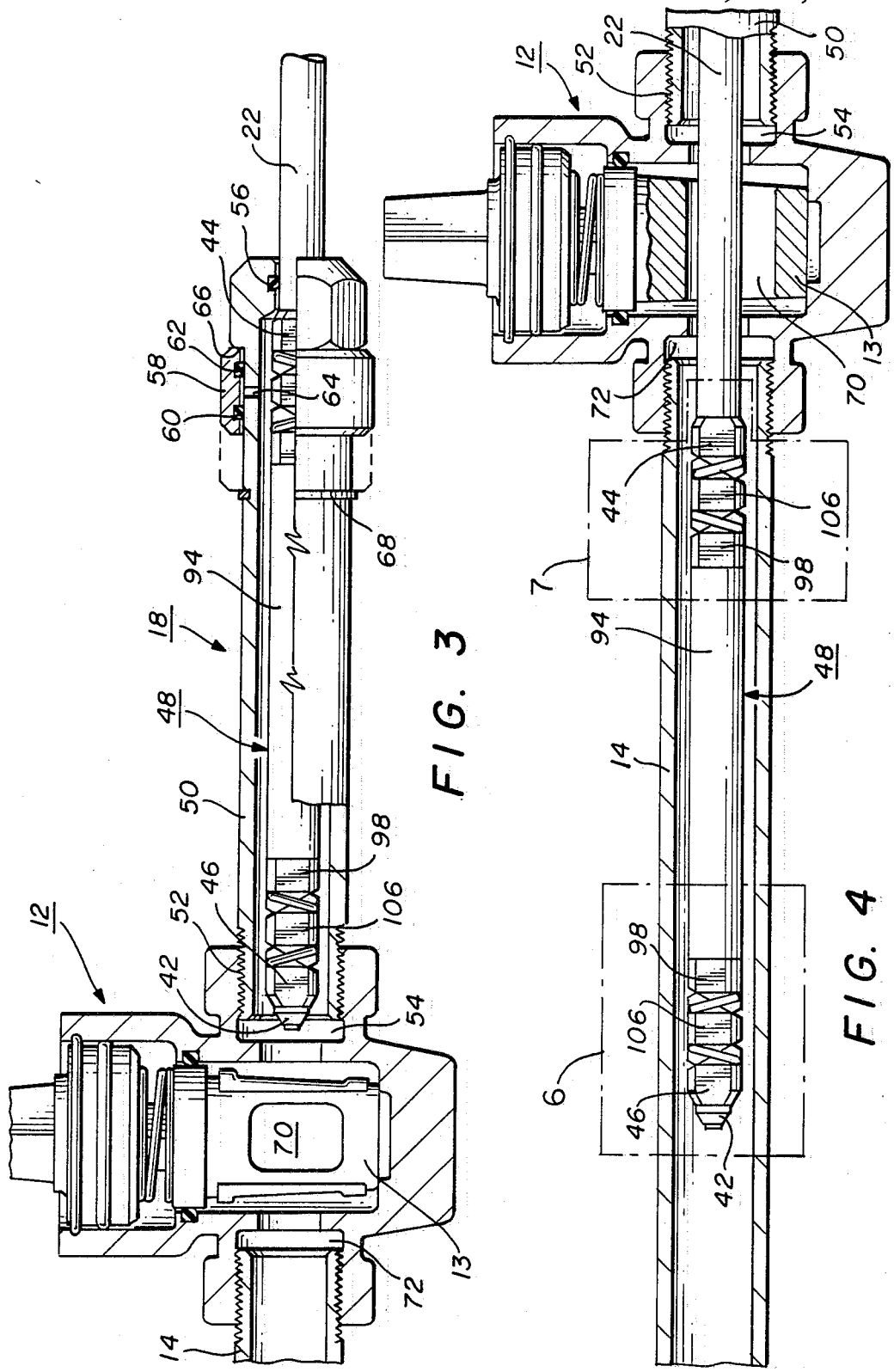

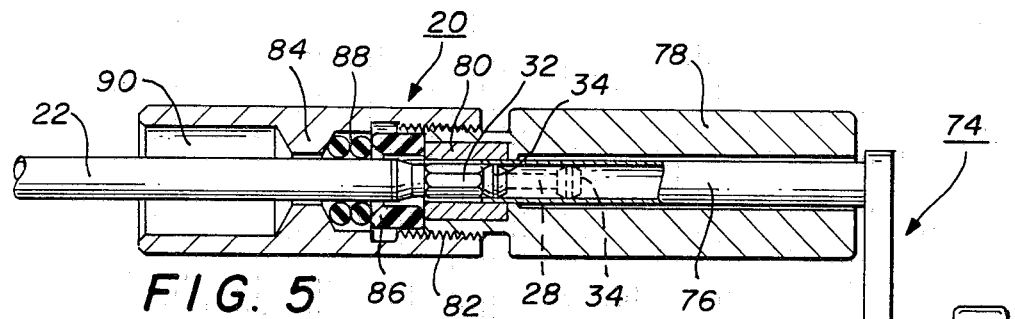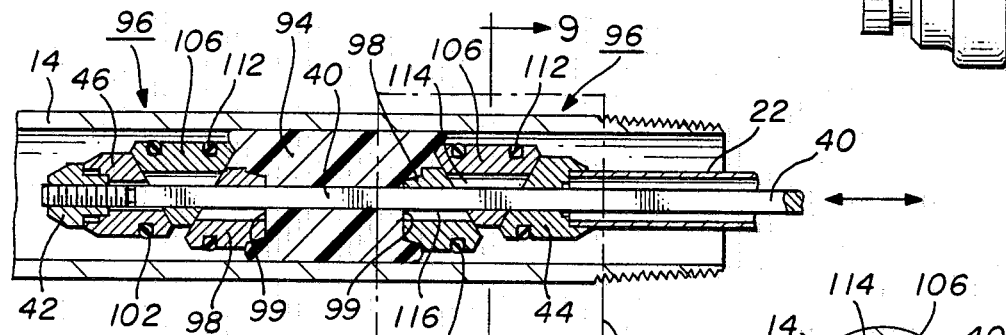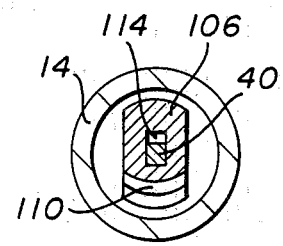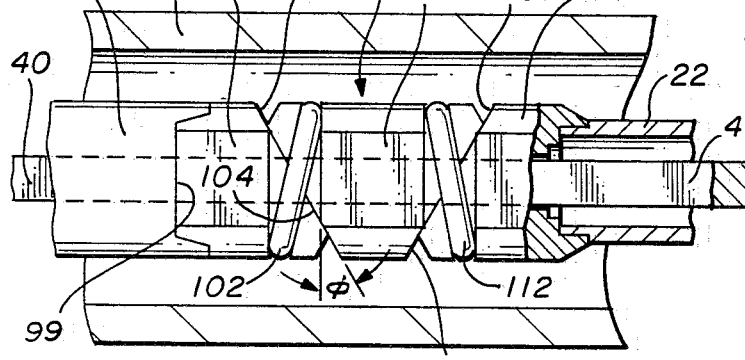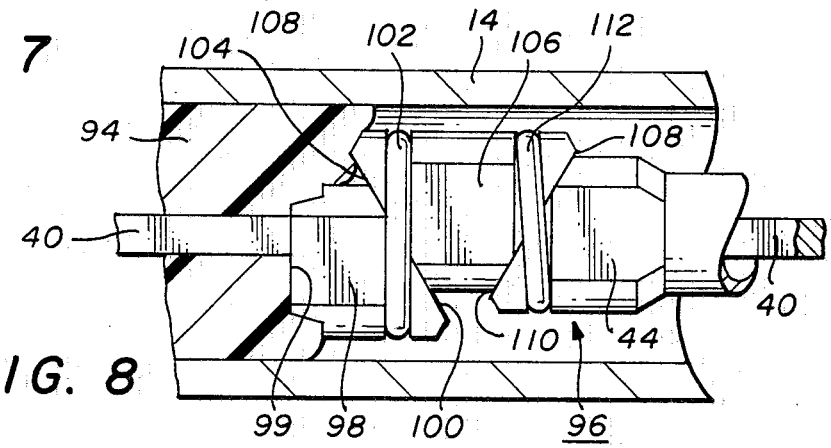

STOP CHANGER TOOL FOR IN-SERVICE VALVE

TECHNICAL FIELD

The technical field to which the invention pertains comprises the field of fluid handling and more specifically to the field of servicing gas distribution meter valves.

BACKGROUND OF THE INVENTION

Valve stop changer tools are commercially available and are utilized extensively in gas distribution lines where it becomes necessary to change out a line valve without depressurizing the upstream service line in which the valve is contained. A physical requirement of such changer tools is that they be able to seal off the pipe upstream of the valve by means of a radially expandable plug which must first be passed through the valve ports from the downstream side of the valve. After the changer tool has been properly positioned and expanded for sealing engagement in the upstream pipe, the valve can be removed and replaced and/or repaired as necessary.

To the extent such changer tools are presently available, they are characterized by a limited expansion ratio in being custom matched by a manufacturer to the port geometries of valves marketed by that same manufacturer. As a result, such prior changer tools are generally unsuitable for valve port geometries manufactured by others. The customer, of course, much prefers for obvious reasons to have a changer tool with much more universal application than presently available to enable use with valves of different manufacture having different port geometries. Despite recognition of the problem, a ready solution therefor has not heretofore been known.

BRIEF SUMMARY OF THE INVENTION

This invention relates to a valve stop changer tool to enable replacement and/or repair of an in-service valve in a gas distribution line under pressure. More specifically, the invention relates to a valve stop changer tool having enhanced versatility as compared to such tools of the prior art in being usable with valve ports of varying geometries. This is achieved in accordance with the changer tool of the invention that affords substantially greater expansion ratio of the seal plug than previously available via an elastomeric plug positioned between a pair of restraining ends. The restraining ends are operable to squeeze and radially expand the plug and are comprised of contiguous elements that are laterally slideable so as to axially confine the plug during the course of its radial expansion. By this means, the entire plug assembly is of sufficiently small dimension when unexpanded as to enable passage through valve ports without regard to the port geometry. Yet by virtue of its greater expansion ratio, the plug assembly can be sufficiently expanded to achieve the required seal in the upstream pipe to enable valve removal.

It is therefore an object of the invention to provide a novel construction for a valve stop changer tool.

It is a further object of the invention to effect the foregoing object in a changer tool having enhanced versatility by not being restricted in its application to a specific valve port geometry with which the tool is to be utilized.

BRIEF DESCRIPTION OF THE DRAWINGS

FIG. 1 is an exterior profile of the valve stop changer tool of the invention shown in relation to a valve with which it is to be utilized;

FIG. 2 an enlarged profile partially sectioned of the body sub-assembly of FIG. 1;

FIG. 3 is an enlarged profile partially sectioned of the changer housing of FIG. 1 as secured to a valve to be removed when the valve is in its closed position;

FIG. 4 is a sectional view of the changer body plug end of FIG. 2 as inserted through the valve to be removed when the valve is in its open position;

FIG. 5 is an enlarged mostly sectional view of the handle sub-assembly of FIG. 1;

FIG. 6 is a sectional view of the outlined portion 6 of FIG. 4 of the expand plug assembly;

FIG. 7 is an enlarged exterior view of the outlined portion 7 of FIG. 4;

FIG. 8 is a fagmentary enlargement of the outlined portion 8 of FIG. 6; and

FIG. 9 is a sectional view as seen substantially from the position 9—9 of FIG. 6.

Referring now to FIG. 1, there is disclosed a valve stop changer tool in accordance herewith designated 10 as adapted for use with a plug valve 12 having a plug 13 (FIG. 3) and secured to a gas service line pipe 14 under pressure. Broadly comprising tool 10 is a body sub-assembly 16, a housing sub-assembly 18 and a handle sub-assembly 20.

Body sub-assembly 16, as more fully disclosed in FIG. 2, is comprised of an elongated body tube 22 which at its rightward end contains a shaft sub-assembly 24 comprising a head bolt 28, a tail rod 40 and a connecting coupling 38. The head bolt extends outward of the end of tube 22 through a guide bushing 30 and is threadedly connected to an operating nut 32. The distal end of bolt 28 contains a stop collar 34, while confined between coupling 38 and bushing 30 is a coiled spring 29 for reasons as will be understood.

Within tube 22 on coupling 38 is a shaft O-ring seal 36 while leftward thereof and connected thereto is the square and elongated tail rod 40 of shaft sub-assembly 24. Mounted on the distal end of rod 40 is a retainer nut 42 which confines the plug 48 and anti-extrusion elements 96 between tail piece 46 and head piece 44. The head piece is secured to the body tube 22 in a manner rotationally interlocked therewith as to prevent rotation of the shaft assembly.

Referring now to FIG. 3, changer sub-assembly 18 is comprised of an elongated tubular body 50 slideably containing the changer body and plug 48. One end of body 50 is threaded at 52 for mounting into the outlet 54 of valve 12. At its opposite end, body 50 includes an internal O-ring seal 56 past which body tube 22 can be slideably displaced. A slideably displaceable vent valve 58 mounted about body 50 contains a pair of spaced apart O-rings 60 and is slideably displaceable from the position shown solid against a shoulder 66 to a position shown dashed against a retainer ring 68. When in the former relation, the vent valve encloses relief port 64, and when, in the latter position relief port 64 is open to atmosphere. Valve 12, as shown in this figure, is in a closed position in that the axes of port 70 of plug 13 extends normal to the plane of the drawing and to the axes extending through the valve inlet 72 and outlet 54. In contrast with the initial assembly of the changer housing to valve 12 as shown in FIG. 3, FIG. 4. illustrates the valve 12 in the open position with port 70 of plug 13 aligned with its inlet and outlet and with the changer plug 48 having been inserted through the valve into the upstream piping 14.

Radial enlargement of changer plug 48 from the relation of FIG. 4 in order to seal pipe 14 is effected via the handle sub-assembly 20 illustrated in FIG. 5 that includes a crank arm 74. The crank arm is rotatably secured to tubular shaft 76 journalled within a handle grip 78 that is threadedly joined via threads 82 to a clamp barrel 84. At its opposite end, shaft 76 is rotatably secured to a socket 80 adapted to receive body nut 32. The end face of handle grip 78 engages a clamp washer 86 which serves to compress two O-ring gaskets 88 for providing a gripping engagement between the handle assembly 20 and the body assembly 16. When cranking arm 74, the knurled surface 92 (FIG. 1) of handle grip 78 is hand held by the operator against rotation for reasons as will be understood. To achieve the relationship of FIG. 4, handle sub-assembly 20 is first attached to valve 12 in the manner of FIG. 3, after which body 16 is pushed leftwardly as viewed in the drawings whereby body tube 22 is slid past O-ring 56 through valve port 70 of plug 12 into the upstream pipe 14.

Expansion of changer plug 48 will now be described with specific reference to FIGS. 2, 4 and 6-9. For these purposes, plug 48 is comprised of a formed elastomeric tube 94 of predetermined length supported about square tail rod 40. The plug is axially retained between a pair of anti-extrusion elements 96, each comprised of an end retainer 98 that interfits into an axial recess 99 at opposite ends of the plug. On its opposite face 100, retainer 98 is canted at an angle $\Phi$ of about 30 degrees with respect to the axis of rod 40. Typically, angle $\Phi$ will be within the range between about 25 degrees and 40 degrees. Juxtaposed to the retainer and resiliently coupled thereto via a rubber O-ring 102 is a wedge-like sliding spacer 106 having a canted complementary face 104 in surface contact with face 100. The opposite canted surface 108 of spacer 106 complements the canted surface of 110 of head piece 44 and tail piece 46 maintained in sliding contact via resilient O-ring 112. As rod 40 is withdrawn for compressing plug 94, the anti-extrusion elements will be caused to incur a lateral sliding displacement from the relation of FIG. 7 to the relation of FIG. 8.

To accommodate the sliding displacement, spacers 106 (FIG. 9) include a rectangular aperture 114 closely embracing rod 40 but having a radial dimension significantly greater than that of the rod. Similarly, end retainers 98 include radially elongated apertures 116 (FIG. 6) dimensionally greater than that of rod 40. With this arrangement, rotation of crank 74 while grip 78 is being hand held against rotation effects a corresponding rotation of nut 32 and via the threaded connection between nut 32 and head bolt 28 (FIG. 2), rod 40 is drawn rightwardly as viewed in the drawing inward of handle tube 76 to the position shown dashed in FIG. 5. This in turn causes anti-extrusion units 96 to be drawn axially toward each other, in the course of which plug 94 is axially compressed. Concomitantly, the confronting canted faces of end retainer 98, spacer 106 and the head and tail pieces 44 and 46 incur a lateral sliding displacement relative to each other from the generally coaligned relation of FIG. 7 to the misaligned relation of FIGS. 6 and 8. As plug 94 continues to be compressed it is forced radially outward until bulging into sealing contact with the wall surface of pipe 14. At the same time, the radial spreading of the elements 98, 106 and 44, 46 provide an axial barrier tending to maintain the expanded plug 94 against axial extrusion.

In operation, handle grip 78 and clamp barrel 84 are threadedly assembled about body tube 22 with nut 32 seated in socket 80. Changer housing 18 is then threadedly secured via threads 52 to the outlet 54 of valve 12 while the plug 13 of valve 12 is in the closed position of FIG. 3. With vent valve 58 positioned to seal aperture 64, plug 13 of valve 12 is rotated to the open position of FIG. 4, after which changer plug 48 is pushed through valve port 70 into the upstream pipe 14. With the changer plug thus positioned, crank 74 is rotated while grip 78 is being hand held against rotation. Via the threaded connection between nut 32 and shaft assembly 24 (FIG. 2), the rotation of nut 32 causes rightward withdrawal of shaft assembly 24. The effect of shaft withdrawal is to draw together the spaced apart anti-extrusion elements 96 during which lateral sliding displacement occurs between the canted faces of the anti-extrusion unit components 98, 106, and 44, 46. Concomitantly resulting is the axial compression of elastomeric plug 94, causing it to bulge radially outward until a sealing relationship is obtained thereat as illustrated in FIGS. 6 and 8. After plug 98 has effected sealing, handle assembly 20 is removed followed by removal of changer housing 18 from valve 12 by being carefully slid off body tube 22. Valve 12 is thereby rendered accessible for removal and/or repair as required without loss of line content from pipe 14.

To effect subsequent removal of changer tool 10, the foregoing steps are reversed as assemblies 18 and 20 are again placed over tube 22 and the former threaded into the outlet of the replaced valve 12. With an unwinding rotation of crank 74, head bolt 28 secured to rod 40 and aided by the force of compressed spring 29, moves leftwardly as viewed in the drawings, causing the anti-extrusion units and plug 94 to relax and revert to the relationship shown in FIGS. 4 and 7. After withdrawing changer plug 48 through the open valve port 70, plug 13 of valve 12 is rotated to its closed position, and vent valve 58 is displaced to uncover port 64 and relieve any gas content contained within body housing 50. Changer housing 18 can then be unthreaded from valve 12 and tool 10 entirely removed.

By the above description there is disclosed a novel construction for a stop changer tool to service or replace an in-service valve under pressure. By virtue of such construction, the tool is able to effect a high expansion ratio on the order of 2.7 or more without significant axial extrusion of the elastomeric expansion plug so as to enable use of the tool with a variety of valve port geometries and overcome the limitation of similar purpose tools of the prior art. The foregoing is effected by a pair of spaced apart anti-extrusion units positioned at each end of an elongated elastomeric plug in which the anti-extrusion units comprise laterally slideable elements providing an axial barrier against plug extrusion in the course of plug compression. By having predetermined face angles operatively effective for overcoming lateral friction in response to an applied axial force, the slideable elements move laterally outward in a fixed direction concomitantly with application of compression force on the plug.

Limiting lateral displacement of the sliding elements is determined by the radial clearance afforded between the rod and the element aperture through which the rod is received. The ultimate effect thereof is to reduce the extrusion clearance of the expansion plug substantially on one plane as to prevent the roll-out and extrusion of the plug that could otherwise occur. Therefore, by a relatively simple, yet effective arrangement of components, a long-standing problem has been solved with respect to enhancing the versatility of such changer tools.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a stop changer tool for removal of an in-service valve exposed to line pressure, including a tubular housing adapted for effecting a pressure-tight connection with the outlet of a valve to be removed, a body tube axially supported for rotation within said tubular housing and extending between a first end adapted to be displaced past the valve connection end of said tubular housing and a second end extending outward of said tubular housing for receiving a drive connection, an elongated shaft within said body tube and threadedly connected thereto, rotational drive means connected to the drive connection end of said body tube and effective when operative to axially displace said shaft within said body tube, and a changer plug supported at the first end of said body tube and expandable in the course of said shaft displacement in a withdrawal direction for sealing an inlet pipe under pressure to which a valve to be removed is connected, the improvement in which said changer plug comprises an elongated elastomeric element responsive when axially compressed to expand in a radially outward direction, and a pair of anti-extrusion units, one of which is positioned juxtaposed at each end of said elastomeric element with each anti-extrusion unit comprising a plurality of axially contiguous elements responsive to a withdrawal displacement of said shaft to axially compress said elastomeric element therebetween while said elements concomitantly displace laterally relative to each other for axially confining the expanded elastomeric element thereat.

2. In a stop changer tool according to claim 1 in which one of said anti-extrusion units is secured to the distal end of said shaft at the outward end of said elastomeric element and the other of said anti-extrusion units is secured to said body tube at the inward end of said elastomeric element.

3. In a stop changer tool according to claims 1 or 2 in which the axially contiguous elements of said anti-extrusion units include complementary canted faces on the juxtaposed surfaces of said elements so as to be laterally slideable relatively over each other and there is included coupling means to resiliently couple the juxtaposed of said contiguous elements to each other.

4. In a stop changer tool according to claim 3 in which each end of said elastomeric element includes a recess, and each anti-extrusion unit is positioned interfit within the said recess thereat.

5. In a stop changer tool according to claim 3 in which the canted faces of said axially contiguous elements have an angle in the range of about between 25 and 40 degrees with respect to a plane extending transverse to the axes thereof.

6. In a stop changer tool according to claim 5 in which each of said axially contiguous elements includes a central aperture through which said shaft extends, and the radial dimension of said aperture is greater than the radial dimension of said shaft for permitting lateral displacement of said elements.

7. In a stop changer tool according to claim 6 in which said coupling means comprises at least one resilient O-ring.

* * * * *